Oct. 28, 1969   C. NEWSTEAD   3,474,683
DRUM BRAKES

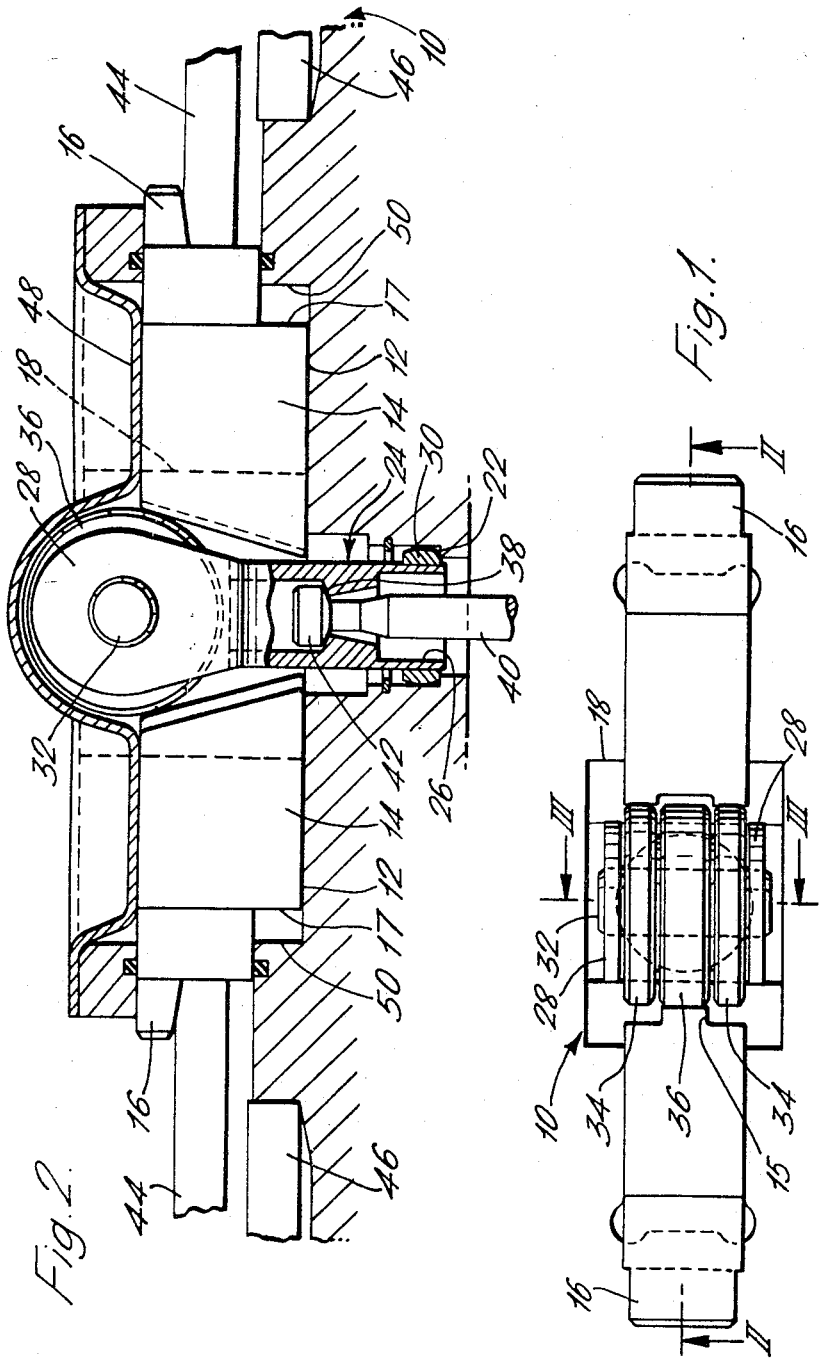

Filed Sept. 20, 1967   4 Sheets-Sheet 3

United States Patent Office 3,474,683
Patented Oct. 28, 1969

3,474,683
DRUM BRAKES
Charles Newstead, Walsall, England, assignor to Girling Limited, Birmingham, England, a British company
Filed Sept. 20, 1967, Ser. No. 669,084
Claims priority, application Great Britain, Sept. 24, 1966, 42,734/66
Int. Cl. F16h 25/18; F16d 51/00
U.S. Cl. 74—110                                    12 Claims

ABSTRACT OF THE DISCLOSURE

A roller expander type of a brake actuator having oppositely displaceable tappets the opposed ends of which are of rectangular surface section and are inclined for engagement by roller means disposed between the two tappets and rotatable on a common shaft which is movable at least in line with the tappet axes.

---

This invention concerns drum brakes for vehicles and relates more particularly to an actuator therefor of the so-called roller expander type.

Various proposals have already been made in relation to roller expander mechanisms for vehicle brake actuation but problems arise, for example, in keeping the rollers in their correct positions with respect to members such as wedges with which they are intended to co-operate in order to produce the expander action. Such problems can be overcome but in themselves the usual solutions tend to introduce additional complications such as the use of roller cages for maintaining the desired roller positions.

According to the present invention, a brake actuator comprises tappets having opposed inclined ends each engaged by roller means and the roller means are rotatable on a common shaft movable at least in line with the tappet axes.

By virtue of the construction proposed by the invention, the positions of the roller means relative to the tappets are maintained by the common shaft, while the ability of the latter to move along the line of the tappet axes provides accommodation for relative and asymmetrical movement of the rollers relative to the tappets and resulting from uneven wear of the brake shoes in use.

Preferably the common shaft is also permitted some degree of movement transverse to the tappets.

The common shaft may conveniently be a pin mounted between the arms of a bifurcated yoke and carrying roller means in the form of a plurality of individual rollers each respectively co-operating with one of the tappets, the yoke itself being rockable to permit the movement of the pin in line with the tappet axes. For this purpose, the yoke may have a stem passing through an externally part-spherical collar engaged in a bore of a body member of the actuator.

Figure 3:
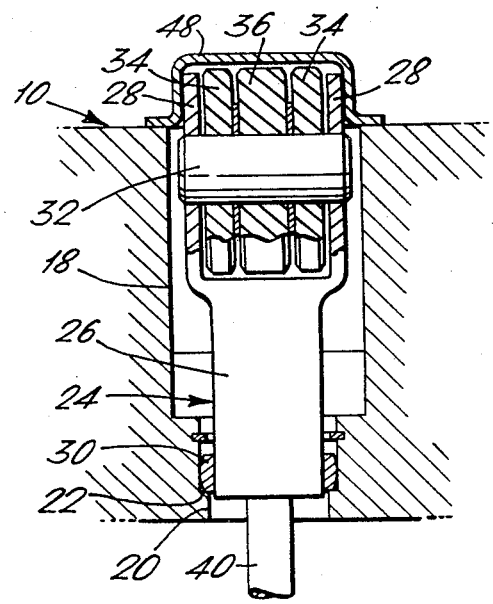
Figure 4:
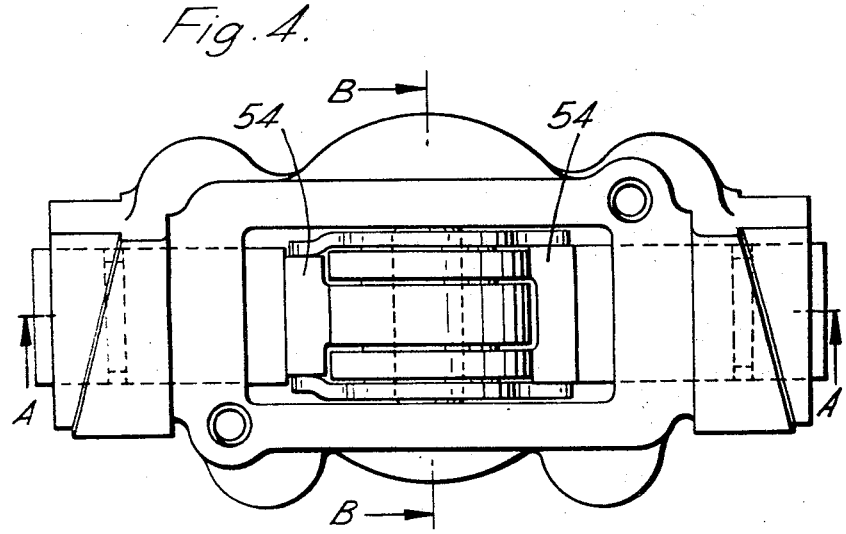
Figure 5:
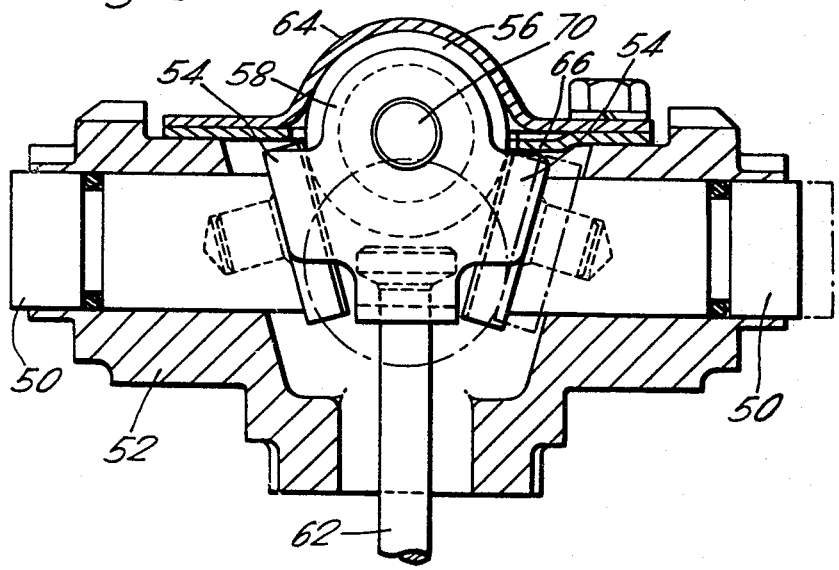
Figure 6:
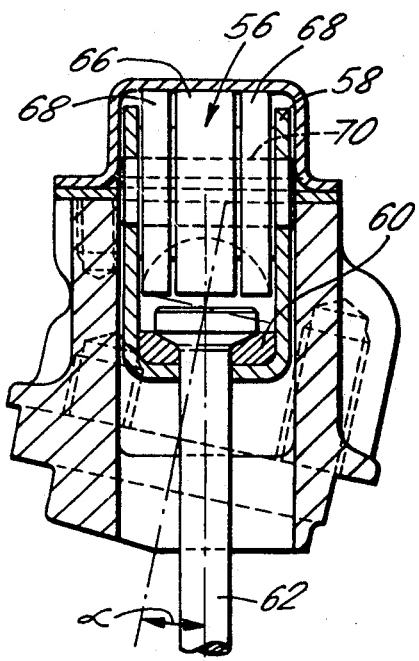
Figure 7:
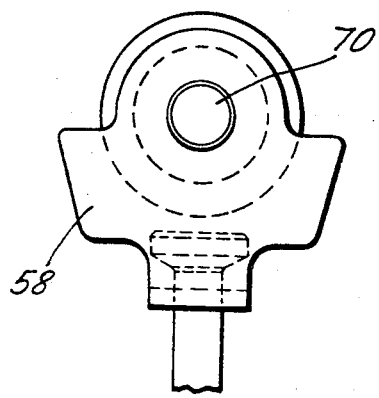
Figure 8:
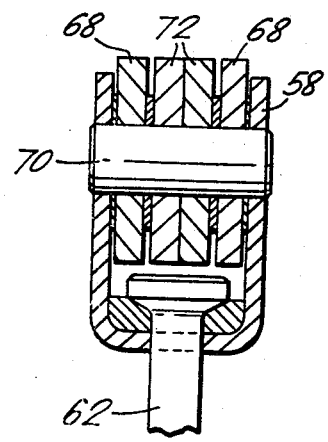
Figure 9:
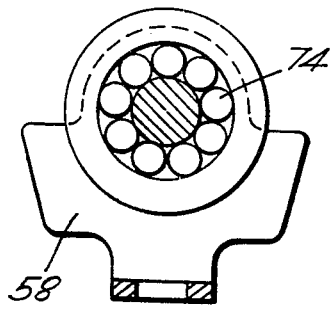
Figure 10:
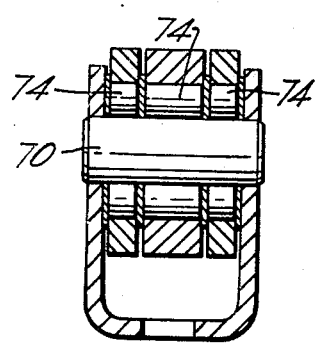

The invention will be described further, by way of example, with reference to the drawings, in which:

FIG. 1 is a plan view, with a cover removed for clarity, of the essential parts of one actuator embodying the invention, FIG. 2 is an axial section taken on the line II—II of FIG. 1 and including parts additional thereto, FIG. 3 is a sectional detail taken on the line III—III of FIG. 1, FIG. 4 is a plan view of another actuator embodying the invention, with a cover removed for clarity, FIG. 5 is an axial section taken on line A—A of FIG. 4, FIG. 6 is a sectional detail taken on the line B—B of FIG. 4, FIG. 7 is a side view of a modification of a part of the actuator of FIG. 4, FIG. 8 is a sectional detail thereof, FIG. 9 is a side view of a further modification of the same part of the actuator of FIG. 4, and FIG. 10 is a sectional detail of this further modification.

The invention as illustrated in the drawings is shown as being applied to a carrier actuated drum brake arrangement in which mechanically displaced tappets operate against carriers which in turn apply the brake shoes to the drum. It will, however, be understood that the invention may equally well be used in a brake without carriers, in which case the tappets directly engage the shoe ends.

In the drawings, an actuator body member 10 is formed with aligned bores 12 in each of which is slidably received a tappet 14 of rectangular section, although tappets of circular section could alternatively be used. Each tappet 14 has an end 16 of circular section projecting slightly from the body member 10. Centrally between the bores 12, the body member 10 is formed with an intermediate chamber 18 and a stepped opening 20 directed perpendicularly to the axes of the bores 12 and having an internal shoulder 22, passes through a wall of the body member bounding one face of the chamber 18.

The inner ends of the tappets extend into the chamber 18 and are equally and oppositely inclined relative to one another. A yoke 24 having a stem 26 terminating in bifurcated arms 28 passes through the opening 20, where the stem is received within an externally part-spherical collar 30 resting on the shoulder 22, the arms 28 of the stem being situated within and beyond the part of the chamber remote from the opening 20. Transversely between the arms 26 is mounted a pin 32 on which are carried two outer rollers 34 and a central, inner roller 36, the rollers 34 engaging the inclined inner end face of the right-hand tappet 14 as viewed in FIGS. 1 and 2 and the central roller 36 engaging the corresponding inner end face of the other tappet. As will be seen, the tappet engaged by the rollers 34 is centrally notched to clear the roller 36 while the other tappet is provided with a central land 15 to contact that roller and enable the remainder of the tappet to clear the rollers 34.

The yoke stem 26 is internally hollow and formed with an internal part-spherical seat 38 for a co-operating head 42 of a pull rod 40 introduced into the stem. The outer ends 16 of the tappets 14 engage carriers 44 which are arranged in turn to apply brake shoes 46 to the brake drum (not shown).

In use, the actuator body member 10 is secured to the usual brake back plate and mechanical operation of the brake is effected by exerting an outward pull on the pull rod 40. This moves the rollers 34 and 36 through the yoke 24 and pin 32 in a direction to cause separation of the tappets 14 which accordingly slide outwardly of their bores 12 to displace the carriers 44 and brake shoes 46. Since the yoke 24 is rockably mounted by virtue of the collar 30, it is able to move inter alia along the line of the tappet axes if required, and in practice, uneven wear of the brake shoes will eventually result in asymmetrical movement of the rollers 34 and 36 with respect to the tappets, this relative movement being accommodated by the ability of the yoke 24 to rock as described.

As will be noted, the actuator is provided with a cover 48 which also serves to stop the rollers in the brake release direction. In the brake applying direction, shoulders 17 defined on the tappets between their ends 16 and the adjoining portions are stopped against shoulders 50 formed in the body member 10. In the off position, the tappets engage the yoke stem 26. It will be noted that the pin 32 is maintained in an endwise direction by the body member walls bounding the chamber 18.

FIGS. 4, 5 and 6 illustrate an alternative embodiment of the invention wherein two oppositely displaceable tappets 50 are guided in aligned bores in a housing 52. The two tappets are of circular cross-section and rectangular bearing pads 54 are spigotted into the inclined inner end faces of the two tappets. The bearing pads 54 are formed from hard wearing material and as best seen in FIG. 4, they are of differing width. The roller assembly generally designated 56 is carried by a yoke 58 which is generally U-shaped and includes a rectangular insert 60 (see FIG. 6) at its lower end having a frusto-spherical recess which constitutes a seating for the head of a pull rod 62. Again referring particularly to FIG. 4, the two bearing pads 54 are a close slipping fit between opposite sides of the U-shaped yoke 58 which serves to centralise the yoke within the housing 52.

The housing is closed by a cover 64 the right hand end of which includes an internal abutment 66, formed by inward deformation of the cover. In order that the right hand tappet clears this abutment, the bearing pad 54 mounted thereon is shorter than the corresponding pad 54 on the left hand tappet. It will be appreciated that because of the abutment 66 the cover could not be fitted to the housing if the tappets were incorrectly assembled. Likewise the tappets cannot be incorrectly fitted in the yoke since they are of differing width and the yoke is dimensioned accordingly.

In order to facilitate mounting adjacent parts of the complete brake assembly the housing 52 is adapted for fitting to a brake backplate (not shown) so that the pull-rod 62 projects from the backplate at an angle X (see FIG. 6). Preferably this angle X equals 11°30′.

The roller assembly 56 may comprise a central roller 66 and two outer rollers 68 mounted for independent rotation about a pin 70. Alternatively, as illustrated in FIGS. 7 and 8, the central roller 66 may comprise a pair of identical rollers 72. In either case roller bearings 74 may be interposed between the rollers and the pin 70 to reduce the drag on the roller due to friction (see FIGS. 9 and 10).

I claim:

1. A brake actuator of the roller expander type comprising, in combination,
   a body member;
   a pull rod;
   two oppositely displaceable tappets slidable in said body member and having opposed inclined rectangular ends;
   a yoke disposed in the body member and slidable between the two opposed tappet ends transversely to the direction of movement of the tappets;
   a single shaft carried by the yoke;
   roller means rotatable on the shaft and engaged by the opposed ends of the tappets, said yoke being rockable relative to said pull rod to permit movement of the roller means in line with the direction of movement of the tappets;
   said pull rod mechanically linked to the yoke to effect the transverse sliding movement thereof between the tappets.

2. A brake actuator as set forth in claim 1 wherein said roller means comprises a plurality of individual rollers of the same diameter each respectively cooperating with a tappet end.

3. A brake actuator as set forth in claim 2 further comprising roller bearing means interposed between the individual rollers and the shaft.

4. A brake actuator as set forth in claim 1 wherein the shaft is permitted same degree of movement transverse to the direction of movement of the tappets.

5. A brake actuator as set forth in claim 1 further comprising;
   a head portion at the end of the pull rod; and
   a hollow stem formed integrally with said yoke to receive said pull rod, the hollow interior of the stem including a region of smaller diameter than the head of the pull rod to define a seating therefor.

6. A brake actuator as set forth in claim 5 further comprising an externally part-spherical collar through which the stem of the yoke is passed, said body member being formed with a bore to receive the collar.

7. A brake actuator as set forth in claim 1 further comprising two rectangular bearing pads one spigotted to each of the inclined ends of the tappets.

8. A brake actuator as set forth in claim 7 wherein the yoke is U-shaped and the shaft is carried in and extends between the two arms of the yoke.

9. A brake actuator as set forth in claim 8 further comprising;
   a head portion at the end of the pull rod; and
   a rectangular insert fitted at the base of the yoke between the two arms thereof and formed with a bore through which the pull rod is passed, said insert being formed with a frusto-spherical recess at the upper end of the bore, to define a seating for the head of the pull rod.

10. A brake actuator as set forth in claim 7 wherein the roller means comprises a central roller for engaging the bearing pad on one tappet and two outer rollers one on each side of the central roller for engaging the bearing pad on the other tappet.

11. A brake actuator as set forth in claim 10 wherein the central roller comprises two rollers of the equal diameter rotatably arranged in juxtaposition on said shaft.

12. A brake actuator as set forth in claim 10 further comprising roller bearing means interposed between the rollers and the shaft.

References Cited

UNITED STATES PATENTS

| | | | |
|---|---|---|---|
| 2,571,052 | 10/1951 | Mount | 287—82 |
| 2,801,120 | 7/1957 | Shepard | 287—91 |
| 2,869,391 | 1/1959 | Brock | 287—91 |
| 2,897,022 | 7/1959 | Marola | 308—208 |
| 3,362,506 | 1/1968 | Mossey | 74—110 |

FRED C. MATTERN, Jr., Primary Examiner

W. S. RATLIFF, Jr., Assistant Examiner

U.S. Cl. X.R.
188—78; 287—91